United States Patent
Luo et al.

(10) Patent No.: US 11,078,105 B2
(45) Date of Patent: Aug. 3, 2021

(54) TRANSPARENT ION-EXCHANGEABLE SILICATE GLASSES WITH HIGH FRACTURE TOUGHNESS

(71) Applicant: CORNING INCORPORATED, Corning, NY (US)

(72) Inventors: Jian Luo, Painted Post, NY (US); John Christopher Mauro, Boalsburg, PA (US)

(73) Assignee: CORNING INCORPORATED, Corning, NY (US)

( * ) Notice: Subject to any disclaimer, the term of this patent is extended or adjusted under 35 U.S.C. 154(b) by 304 days.

(21) Appl. No.: 16/136,537

(22) Filed: Sep. 20, 2018

(65) Prior Publication Data

US 2019/0084869 A1 Mar. 21, 2019

Related U.S. Application Data

(60) Provisional application No. 62/561,399, filed on Sep. 21, 2017.

(51) Int. Cl.
| | | |
|---|---|---|
| *C03C 3/095* | (2006.01) | |
| *C03C 3/062* | (2006.01) | |
| *C03C 3/085* | (2006.01) | |
| *C03C 3/078* | (2006.01) | |
| *C03C 3/097* | (2006.01) | |

(52) U.S. Cl.
CPC .............. *C03C 3/095* (2013.01); *C03C 3/062* (2013.01); *C03C 3/078* (2013.01); *C03C 3/085* (2013.01); *C03C 3/097* (2013.01)

(58) Field of Classification Search
CPC ......... C03C 3/097; C03C 3/062; C03C 3/095; C03C 3/085
See application file for complete search history.

(56) References Cited

U.S. PATENT DOCUMENTS

| | | |
|---|---|---|
| 2,805,166 A | 9/1957 | Loffler |
| 3,513,004 A | 5/1970 | Kohut et al. |
| 3,615,769 A | 10/1971 | Leitz et al. |
| 3,785,836 A | 1/1974 | Bacon |
| 3,804,646 A | 4/1974 | Dumbaugh, Jr. |
| 3,811,901 A | 5/1974 | Bacon |
| 6,914,371 B2 | 7/2005 | Martin et al. |
| 7,659,222 B2 | 2/2010 | Shimizu |
| 7,754,356 B2 | 7/2010 | Nagashima et al. |
| 8,361,917 B2 | 1/2013 | Li et al. |
| 2005/0181221 A1 | 8/2005 | Martin et al. |
| 2009/0105061 A1 | 4/2009 | Fujiwara et al. |
| 2013/0324649 A1* | 12/2013 | Doi .................. C08K 5/527 524/120 |
| 2014/0141226 A1 | 5/2014 | Bookbinder et al. |
| 2015/0018194 A1 | 1/2015 | Li et al. |
| 2017/0101338 A1 | 4/2017 | Li et al. |
| 2018/0022635 A1 | 1/2018 | Luo et al. |

FOREIGN PATENT DOCUMENTS

| | | |
|---|---|---|
| JP | 2001134925 A | 5/2001 |
| JP | 2003089543 A | 3/2003 |

OTHER PUBLICATIONS

International Search Report and Written Opinion PCT/US2018/051843 dated Dec. 5, 2018, 10 Pgs.
Bacon J.R.; "The Kinetics of Crystallization of Molten Binary and Ternary Oxide Systems and Their Application to the Origination of High Modulus Glass Fibers"; (Prepared for NASA), United Aircraft Research Laboratories, East Hartford, Connecticut, 1971; 312 Pages.
Bubsey et al; "Closed-Form Expressions for Crack-Mouth Displacement and Stress Intensity Factors for Chevron-Notched Short Bar and Short Rod Specimens Based on Experimental Compliance Measurements"; NASA Technical Memorandum; 83796; pp. 1-30 (1992).
Darwent, B. Deb; "Bond Dissociation Energies in Simple Molecules"; United States Department of Commerence, NSRDS-NBS 31; 1970; 60 Pages.
Gautam; "Synthesis and Optical Properties of SiO2—Al2O3—MgO—K2CO3—CaO—MgF2—La2O3 Glasses"; Bull. Mater. Sci., vol. 39, No. 3, 2016; pp. 677-682.
Krey et al; "Effect of B2O3 and Fluoride Additions on the Yb3+ Luminescence of an Alumosilicate Glass in the System Li2O/MgO/Al2O3/SiO2"; Optical Materials Express, vol. 6, No. 8 (2016); pp. 2662-2670.
Pan et al; "Thermal, Mechanical, and Upconversion Properties of Er3+/Yb3+ Co-Doped Titanate Glass Prepared by Levitation Method"; Journal of Alloys and Compounds 509, 7504-7507, doi:10.1016/j.jallcom.2011.04.104 (2011).
Reddy et al; "Fracture Toughness Measurement of Glass and Ceramic Materials Using Chevron-Notched Specimens"; J. Am. Ceram. Soc., 71 (6), C310-C313 (1988).
Shelby et al; "Rare-Earth Aluminosilicate Glasses"; J. Am. Ceram. Soc., 73 (1) pp. 39-42 (1990).
Shi et al; "Intrinsic Ductility of Glassy Solids"; Journal of Applied Physics; 115, p. 043528-1-043528-17.
Tarafder et al; "Nanostructuring and Fluorescence Properties of Eu3+:LiTaO3 in Li2O—Ta2O5—SiO2—Al2O3 Glass-Ceramics"; Journal of Materials Science 44, 4495-4498, doi:10.1007/s10853-009-3659-5 (2009).
Wang et al; "Influence of Nucleation Agents on Crystallization and Machinability of Mica Glass-Ceramics"; Ceramics International; 35 (2009) 2633-2638.
Zhang et al; "A Novel Upconversion TiO2—La2O3—Ta2O5 Bulk Glass Co-Doped With Er3+/Yb3+ Fabricated by Containerless Processing"; Materials Letters 66, (2012) 367-369.

* cited by examiner

*Primary Examiner* — Elizabeth A. Bolden
(74) *Attorney, Agent, or Firm* — John P. McGroarty

(57) ABSTRACT

Provided herein are glass based articles comprising $SiO_2$ in a range from about 20 mol % to about 80 mol %; $Al_2O_3$ in a range from about 2 mol % to about 60 mol %; MgO; $Li_2O$; $La_2O_3$ in an amount greater than or equal to about 3 mol %; a sum of alkali metal oxides ($R_2O$) is greater than or equal to about 6 mol %; and a sum of MgO and $Al_2O_3$ is greater than or equal to about 28 mol %, wherein the glass based article is free of $B_2O_3$.

14 Claims, 1 Drawing Sheet

TRANSPARENT ION-EXCHANGEABLE SILICATE GLASSES WITH HIGH FRACTURE TOUGHNESS

This application claims the benefit of priority under 35 U.S.C. § 119 of U.S. Provisional Application Ser. No. 62/561,399 filed on Sep. 21, 2017, the content of which is relied upon and incorporated herein by reference in its entirety.

FIELD AND BACKGROUND

The present disclosure is generally related to novel glass based articles.

Glass is a brittle material which can sometimes break during use. The fracture toughness of commercially used glasses is usually close to or below 0.8 MPa*m$^{0.5}$. There are continued desires to obtain glasses, such as transparent glasses, with high fracture toughness to improve damage resistance and/or drop performance.

BRIEF SUMMARY

In various embodiments, the present disclosure provides a glass based article comprising $SiO_2$ in a range from about 20 mol % to about 80 mol %; $Al_2O_3$ in a range from about 2 mol % to about 60 mol %; MgO; $Li_2O$; $La_2O_3$ in an amount greater than or equal to about 3 mol %; a sum of alkali metal oxides ($R_2O$) is greater than or equal to about 6 mol %; and a sum of MgO and $Al_2O_3$ is greater than or equal to about 28 mol %, wherein the glass based article is free of $B_2O_3$.

BRIEF DESCRIPTION OF THE FIGURES

The foregoing summary, as well as the following detailed description of the embodiments, will be better understood when read in conjunction with the appended figures. For the purpose of illustration, the figures may describe the use of specific embodiments. It should be understood, however, that the compositions and methods described herein are not limited to the precise embodiments discussed or described in the figures.

DETAILED DESCRIPTION OF THE INVENTION

Definitions

Figure 1A:
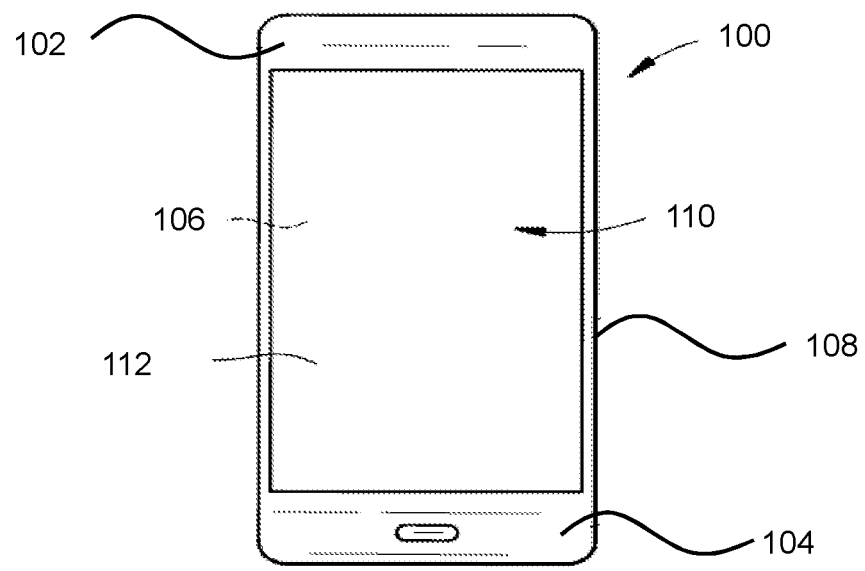
FIG. 1A is a plan view of an exemplary electronic device incorporating any of the glass based articles disclosed herein.

Open terms such as "include," "including," "contain," "containing" and the like mean "comprising." These open-ended transitional phrases are used to introduce an open ended list of elements, method steps or the like that does not exclude additional, unrecited elements or method steps. It is understood that wherever embodiments are described with the language "comprising," otherwise analogous embodiments described in terms of "consisting of" and/or "consisting essentially of" are also provided.

The transitional phrase "consisting of" and variations thereof excludes any element, step, or ingredient not recited, except for impurities ordinarily associated therewith.

The transitional phrase "consists essentially of" or variations such as "consist essentially of" or "consisting essentially of" excludes any element, step, or ingredient not recited except for those that do not materially change the basic or novel properties of the specified method, structure or composition.

Also, the indefinite articles "a" and "an" preceding an element or component of the disclosure are intended to be nonrestrictive regarding the number of instances, i.e., occurrences of the element or component. Therefore "a" or "an" should be read to include one or at least one, and the singular word form of the element or component also includes the plural unless the number is obviously meant to be singular.

As used herein, the term "about" modifying a value related to the disclosure refers to variation in the numerical quantity that can occur, for example, through routine testing and handling; through inadvertent error in such testing and handling; through differences in the manufacture, source, or purity of ingredients employed in the disclosure; and the like. Whether or not modified by the term "about", the claims include equivalents of the recited quantities. In one embodiment, the term "about" means within 10% of the reported numerical value.

The terms "disclosure" or "present disclosure" as used herein are non-limiting terms and are not intended to refer to any single embodiment of the particular disclosure but encompass all possible embodiments as described in the application.

As used herein, the terms "glass based article" and "glass based articles" are used in their broadest sense to include any object made wholly or partly of glass and includes glass ceramics. As used herein, a glass ceramic has an amorphous phase and one or more crystalline phases.

Whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any sub-ranges therebetween. Unless otherwise specified, all compositions and relationships that include constituents of compositions described herein are expressed in mole percent (mol %) on a metal oxide basis.

Glass Compositions

In various embodiments, the present disclosure provides a glass based article including $La_2O_3$. In some embodiments, the glass based article comprises $SiO_2$, $Al_2O_3$, $La_2O_3$, MgO, $Li_2O$, and is free of $B_2O_3$. In some embodiments, the glass based article consists of or consisting essentially of $SiO_2$, $Al_2O_3$, $La_2O_3$, MgO, $Li_2O$.

The glass based article described herein can include various amount of silica, or $SiO_2$. While not wishing to be bound by theories, it is believed that $SiO_2$ is the primary glass forming oxide, which forms the network backbone for the glass. Pure $SiO_2$ is incompatible with most manufacturing processes owing to its extremely high melting temperature. Since the viscosity of pure $SiO_2$ or high-$SiO_2$ glasses is too high in the melting region, defects such as fining bubbles may appear, and erosion of refractories and degradation of platinum may become too extreme to permit long-term manufacturing in a continuous process. Furthermore, as silica concentration increases, the liquidus temperature may increase due to increasing stability of cristobalite, a crystalline polymorph of $SiO_2$ that is an undesirable devitrification phase in a continuous process. However, a minimum level of $SiO_2$ is required to ensure good chemical durability and compatibility with refractory materials used in manufacturing. Those skilled in the art could adjust the amount of $SiO_2$ in view of this disclosure.

In the glass based articles of this disclosure, the concentration of $SiO_2$ can be in a range from about 20 mol % to about 80 mol % (e.g., about 25 mol %, about 30 mol %, about 35 mol %, about 40 mol %, about 45 mol %, about 50 mol %, about 55 mol %, about 60 mol %, about 65 mol %, about 70 mol %, about 75 mol %, about 80 mol %, or any ranges between the specified values). For example, in some embodiments, the concentration of $SiO_2$ ranges from about 20 mol % to about 75 mol %, about 20 mol % to about 70 mol %, about 20 mol % to about 65 mol %, about 20 mol % to about 60 mol %, about 25 mol % to about 80 mol %, about 25 mol % to about 75 mol %, about 25 mol % to about 70 mol %, about 25 mol % to about 65 mol %, about 25 mol % to about 60 mol %, about 30 mol % to about 80 mol %, about 30 mol % to about 75 mol %, about 30 mol % to about 70 mol %, about 30 mol % to about 65 mol %, about 30 mol % to about 60 mol %, about 35 mol % to about 80 mol %, about 35 mol % to about 75 mol %, about 35 mol % to about 70 mol %, about 35 mol % to about 65 mol %, about 35 mol % to about 60 mol %, about 40 mol % to about 80 mol %, about 40 mol % to about 75 mol %, about 40 mol % to about 70 mol %, about 40 mol % to about 65 mol %, about 40 mol % to about 60 mol %, about 45 mol % to about 80 mol %, about 45 mol % to about 75 mol %, about 45 mol % to about 70 mol %, about 45 mol % to about 65 mol %, about 45 mol % to about 60 mol %, about 50 mol % to about 80 mol %, about 50 mol % to about 75 mol %, about 50 mol % to about 70 mol %, about 50 mol % to about 65 mol %, about 50 mol % to about 60 mol %, about 60 mol % to about 80 mol %, about 70 mol % to about 80 mol %, or all ranges and subranges therebetween.

The glass based article described herein typically includes aluminum oxide, or $Al_2O_3$. While not wishing to be bound by theories, it is believed that $Al_2O_3$ can also serves as a glass former. Like $SiO_2$, $Al_2O_3$ can also contribute rigidity to the glass network due to its tetrahedral coordination. Similarly, an increase in $Al_2O_3$ content relative to other glass modifier oxides generally results in decreased density, decreased coefficient of thermal expansion, and improved durability. However, the concentration of $Al_2O_3$ may be limited. For example, when the concentration is too high, $Al_2O_3$ can promote the dissolution of zircon refractory material, which can lead to fusion line zirconia defects, and can lead to a softening point that is unfavorably high for 3D glass forming. Thus, the amounts of $Al_2O_3$ are adjusted to balance these various properties.

In the glass based articles of this disclosure, the concentration of $Al_2O_3$ can range from about 2 mol % to about 60 mol % (e.g., about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 20 mol %, about 25 mol %, about 30 mol %, about 35 mol %, about 40 mol %, about 45 mol %, about 50 mol %, about 60 mol %, or any ranges between the specified values). For example, in some embodiments, the concentration of $Al_2O_3$ ranges from about 2 mol % to about 55 mol %, about 2 mol % to about 50 mol %, about 2 mol % to about 45 mol %, about 2 mol % to about 40 mol %, about 2 mol % to about 35 mol %, about 2 mol % to about 30 mol %, about 2 mol % to about 25 mol %, about 2 mol % to about 20 mol %, about 2 mol % to about 15 mol %, about 2 mol % to about 10 mol %, about 4 mol % to about 60 mol %, about 4 mol % to about 55 mol %, about 4 mol % to about 50 mol %, about 4 mol % to about 45 mol %, about 4 mol % to about 40 mol %, about 4 mol % to about 35 mol %, about 4 mol % to about 30 mol %, about 4 mol % to about 25 mol %, about 4 mol % to about 20 mol %, about 4 mol % to about 15 mol %, about 4 mol % to about 10 mol %, about 8 mol % to about 60 mol %, about 8 mol % to about 55 mol %, about 8 mol % to about 50 mol %, about 8 mol % to about 45 mol %, about 8 mol % to about 40 mol %, about 8 mol % to about 35 mol %, about 8 mol % to about 30 mol %, about 8 mol % to about 25 mol %, about 8 mol % to about 20 mol %, about 8 mol % to about 15 mol %, about 10 mol % to about 60 mol %, about 10 mol % to about 55 mol %, about 10 mol % to about 50 mol %, about 10 mol % to about 45 mol %, about 10 mol % to about 40 mol %, about 10 mol % to about 35 mol %, about 10 mol % to about 30 mol %, about 10 mol % to about 25 mol %, about 10 mol % to about 20 mol %, about 10 mol % to about 15 mol %, about 15 mol % to about 60 mol %, about 15 mol % to about 55 mol %, about 15 mol % to about 50 mol %, about 15 mol % to about 45 mol %, about 15 mol % to about 40 mol %, about 15 mol % to about 35 mol %, about 15 mol % to about 30 mol %, about 15 mol % to about 25 mol %, about 15 mol % to about 20 mol %, about 20 mol % to about 60 mol %, about 20 mol % to about 55 mol %, about 20 mol % to about 50 mol %, about 20 mol % to about 45 mol %, about 20 mol % to about 40 mol %, about 20 mol % to about 35 mol %, about 20 mol % to about 30 mol %, about 20 mol % to about 25 mol %, or all ranges and subranges therebetween.

In some embodiments, the glass based article described herein comprises Lanthanum oxide, or $La_2O_3$. While not wishing to be bound by theories, it is believed that $La_2O_3$ is important to increase the bonding strength and reduce the angular constraint. However too high a concentration of $La_2O_3$ can increase the melting temperature and render the composition incompatible with most manufacturing processes and can promote crystallization. In the glass based articles of this disclosure, the concentration of $La_2O_3$ can be greater than or equal to about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, or any ranges between the specified values). In some embodiments, the concentration of $La_2O_3$ ranges from about 3 mol % to about 18 mol %, about 3 mol % to about 15 mol %, about 3 mol % to about 10 mol %, about 5 mol % to about 18 mol %, about 5 mol % to about 15 mol %, about 5 mol % to about 10 mol %, about 10 mol % to about 18 mol %, about 10 mol % to about 15 mol %, or any ranges and subranges therebetween.

In some embodiments, the glass based article described herein comprises magnesium oxide, or MgO. While not wishing to be bound by theories, it is believed that MgO has high field strength, which increases the Young's modulus of the glass based article. However too high a concentration of MgO can promote crystallization. In the glass based articles of this disclosure, the concentration of MgO range from about 1 mol % to about 42 mol % (e.g., about 1 mol %, about 2 mol %, about 3 mol %, about 4 mol %, about 5 mol %, about 6 mol %, about 7 mol %, about 8 mol %, about 9 mol %, about 10 mol %, about 15 mol %, about 20 mol %, about 25 mol %, about 30 mol %, about 32 mol %, about 35 mol %, about 37 mol %, about 40 mol %, about 42 mol %, or any ranges between the specified values). In some embodiments, the concentration of MgO ranges from about 1 mol % to about 42 mol %, about 1 mol % to about 40 mol %, about 1 mol % to about 37 mol %, about 1 mol % to about 35 mol %, about 1 mol % to about 32 mol %, about 1 mol % to about 30 mol %, about 1 mol % to about 25 mol %, about 1 mol % to about 20 mol %, about 1 mol % to about 15 mol %, about 1 mol % to about 10 mol %, about 2 mol % to about 42 mol %, about 2 mol % to about 40 mol %, about 2 mol % to about 37 mol %, about 2 mol % to about 35 mol %, about 2 mol % to about 32 mol %, about 2 mol % to about 30 mol %, about 2 mol % to about 25 mol %, about 2 mol % to about 20 mol %, about 2 mol % to about 15 mol %, about 2 mol % to about 10 mol %, about 3 mol % to about 42 mol %, about 3 mol % to about 40 mol %, about 3 mol % to about 37 mol %, about 3 mol % to about 35 mol %, about 3 mol % to about 32 mol %, about 3 mol % to about 30 mol %, about 3 mol % to about 25 mol %, about 3 mol % to about 20 mol %, about 3 mol % to about 15 mol %, about 3 mol % to about 10 mol %, about 5 mol % to about 42 mol %, about 5 mol % to about 40 mol %, about 5 mol % to about 37 mol %, about 5 mol % to about 35 mol %, about 5 mol % to about 32 mol %, about 5 mol % to about 30 mol %, about 5 mol % to about 25 mol %, about 5 mol % to about 20 mol %, about 5 mol % to about 15 mol %, about 5 mol % to about 10 mol %, about 10 mol % to about 42 mol %, about 10 mol % to about 40 mol %, about 10 mol % to about 37 mol %, about 10 mol % to about 35 mol %, about 10 mol % to about 32 mol %, about 10 mol % to about 30 mol %, about 10 mol % to about 25 mol %, about 10 mol % to about 20 mol %, about 10 mol % to about 15 mol %, or any ranges and subranges therebetween.

In some embodiments, the glass based articles described herein comprises one or more alkali metal oxides, or $R_2O$ where R is an alkali metal such as lithium, sodium, potassium, rubidium, or cesium. In some embodiments, the glass based articles comprise one or more of $Li_2O$, $Na_2O$, $K_2O$, $Rb_2O$, or $Cs_2O$, two or more of $Li_2O$, $Na_2O$, $K_2O$, $Rb_2O$, or $Cs_2O$, three or more of $Li_2O$, $Na_2O$, $K_2O$, $Rb_2O$, or $Cs_2O$, or four or more of $Li_2O$, $Na_2O$, $K_2O$, $Rb_2O$, or $Cs_2O$. Thus in some embodiments, the glass based articles may comprise only $Li_2O$, only $Na_2O$, or only $K_2O$. In other embodiments, the glass base articles may comprise only $Li_2O$ and $Na_2O$, only $Li_2O$ and $K_2O$, or only $K_2O$ and $Na_2O$. Alkali metal oxides allow the glass based article to be ion exchanged to chemically strengthen the glass based article. Alkali metal oxides having an alkali metal with a small ionic radius such as lithium or sodium also have high field strength, which increases the Young's modulus of the glass based article. However too high a concentration of alkali metal oxides can increase the tendency for crystallization. In the glass based articles of this disclosure, the concentration of the sum of the alkali metal oxides can be greater than or equal to about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol % or any ranges between the specified values). In some embodiments, the concentration of the sum of the alkali metal oxides can range from about 6 mol % to about 20 mol %, about 6 mol % to about 18 mol %, about 6 mol % to about 15 mol %, about 6 mol % to about 12 mol %, about 6 mol % to about 10 mol %, about 8 mol % to about 20 mol %, about 8 mol % to about 18 mol %, about 8 mol % to about 15 mol %, about 8 mol % to about 12 mol %, about 8 mol % to about 10 mol %, about 10 mol % to about 20 mol %, about 10 mol % to about 18 mol %, about 10 mol % to about 15 mol %, about 10 mol % to about 12 mol %, or any ranges and subranges therebetween.

In some embodiments, the individual alkali metal oxides can have a concentration in a range from about 4 mol % to about 18 mol %, about 4 mol % to about 15 mol %, about 4 mol % to about 12 mol %, about 4 mol % to about 10 mol %, about 5 mol % to about 18 mol %, about 5 mol % to about 15 mol %, about 5 mol % to about 12 mol %, about 5 mol % to about 10 mol %, 6 mol % to about 20 mol %, about 6 mol % to about 18 mol %, about 6 mol % to about 15 mol %, about 6 mol % to about 12 mol %, about 6 mol % to about 10 mol %, about 8 mol % to about 20 mol %, about 8 mol % to about 18 mol %, about 8 mol % to about 15 mol %, about 8 mol % to about 12 mol %, about 8 mol % to about 10 mol %, about 10 mol % to about 20 mol %, about 10 mol % to about 18 mol %, about 10 mol % to about 15 mol %, about 10 mol % to about 12 mol %, or any ranges and subranges therebetween.

In some embodiments, a sum of the concentration of MgO and $Al_2O_3$ can be greater than about 28 mol %, about 29 mol %, about 30 mol %, about 31 mol %, about 32 mol %, about 33 mol %, about 34 mol %, about 35 mol %, about 36 mol %, about 37 mol %, about 38 mol %, about 39 mol %, about 40 mol %, about 41 mol %, about 42 mol %, or about 43 mol %. In some embodiments, a sum of the concentration of MgO and $Al_2O_3$ can be in a range from greater than about 28 mol % to about 43 mol %, greater than about 28 mol % to about 41 mol %, greater than about 28 mol % to about 37 mol %, greater than about 28 mol % to about 35 mol %, greater than about 28 mol % to about 33 mol %, greater than about 28 mol % to about 30 mol %, greater than about 30 mol % to about 43 mol %, about 30 mol % to about 41 mol %, about 30 mol % to about 37 mol %, about 30 mol % to about 35 mol %, about 30 mol % to about 33 mol %, greater than about 33 mol % to about 43 mol %, about 33 mol % to about 41 mol %, about 33 mol % to about 37 mol %, about 33 mol % to about 35 mol %, greater than about 35 mol % to about 43 mol %, about 35 mol % to about 41 mol %, about 35 mol % to about 37 mol %, or any ranges and sub ranges therebetween.

In some embodiments, the glass based article is free of one or more of $B_2O_3$, $As_2O_3$, $Sb_2O_3$. As used herein, the term "free of" means that the component is not added as a component of the batch material even though the component may be present in the final glass based article in very small amounts as a contaminate, such as less than 0.1 mol %.

Properties of Glass Based Articles

In some embodiments, the glassed based articles described herein can have one or more of the following properties. For example, in various embodiments, the glass based article exhibits high fracture toughness. In some embodiments, the glass based article exhibits a high Young's modulus value, which can lead to high hardness. In some embodiments, the glass based article exhibits a low stress optical coefficient (SOC). In any of the embodiments described herein, the glass based article can be substantially transparent in the visible spectrum.

Competitions between shear and cleavage govern the ductile/brittle behavior of materials. At the crack tip, if the energy or stress required for shear is lower than that for cleavage, crack tip will be blunted by shear and the material will exhibit ductility or high fracture toughness. At the atomic level, the brittle/ductile behavior of glasses can be governed by the competition between bonding strength and angular constraint in the glass network. A relative increase in bonding strength or a relative decrease in angular constraint can increase ductility by preventing cleavage or promoting shear deformation.

While not wishing to be bound by theories, it is believed that the glass based articles described herein can achieve high fracture toughness through the presence of lanthanum, which bonds strongly to oxygen and in the meantime reduces the angular constraint.

In various embodiments, this disclosure provides a glass based article characterized by a high fracture toughness. For example, in any of the embodiments described herein, the glass based article can have a fracture toughness values of at least 0.8 MPa*m$^{0.05}$ (e.g., at least 0.85 MPa*m$^{0.05}$, at least 0.9 MPa*m$^{0.05}$, at least 0.95 MPa*m$^{0.05}$, at least 1 MPa*m$^{0.05}$). In some embodiments, the glass based article can have a fracture toughness values of about 0.8 MPa*m$^{0.05}$, about 0.85 MPa*m$^{0.05}$, about 0.9 MPa*m$^{0.05}$, about 0.95 MPa*m$^{0.05}$, about 1 MPa*m$^{0.05}$, about 1.1 MPa*m$^{0.05}$, about 1.2 MPa*m$^{0.05}$, about 1.3 MPa*m$^{0.05}$, or any ranges and subranges between the specified values. For example, in some embodiments, the glass based article can have a fracture toughness values in a range from about 0.8 MPa*m$^{0.05}$ to about 1.3 MPa*m$^{0.05}$, about 0.8 MPa*m$^{0.05}$ to about 1 MPa*m$^{0.05}$, about 0.85 MPa*m$^{0.05}$ to about 1.3 MPa*m$^{0.05}$, about 0.85 MPa*m$^{0.05}$ to about 1 MPa*m$^{0.05}$, about 0.9 MPa*m$^{0.05}$ to about 1.3 MPa*m$^{0.05}$, about 0.9 MPa*m$^{0.05}$ to about 1 MPa*m$^{0.05}$, about 0.95 MPa*m$^{0.05}$ to about 1.3 MPa*m$^{0.05}$, about 0.95 MPa*m$^{0.05}$ to about 1 MPa*m$^{0.05}$, or any ranges and subranges therebetween. The fracture toughness value ($K_{1C}$) recited in this disclosure refers to a value as measured by chevron notched short bar (CNSB) method disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that Y*m is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992).

In various embodiments, this disclosure also provides a glass based article characterized by a high Young's modulus value. As understood by those skilled in the art, Young's modulus value can reflect the hardness of the glass based article. In any of the embodiments described herein, the glass based article can have a Young's modulus value of at least 90 GPa (e.g., at least 95 GPa; at least 100 GPa; at least 105 GPa; at least 110 GPa; at least 120 GPa; at least 130 GPa; or at least 140 GPa). For example, the glass based article can have a Young's modulus value of about 90 GPa; about 95 GPa; about 100 GPa; about 105 GPa; about 110 GPa; about 120 GPa, about 130 GPa, about 140 GPa, or any ranges and subranges between the specified values. In some embodiments, the glass based article has a Young's modulus value in a range from about 90 GPa to about 140 GPa, about 90 GPa to about 135 GPa, about 90 GPa to about 130 GPa, about 90 GPa to about 125 GPa, about 90 GPa to about 120 GPa, about 90 GPa to about 115 GPa, about 90 GPa to about 110 GPa, about 95 GPa to about 140 GPa, about 95 GPa to about 135 GPa, about 95 GPa to about 130 GPa, about 95 GPa to about 125 GPa, about 95 GPa to about 120 GPa, about 95 GPa to about 115 GPa, about 95 GPa to about 110 GPa, about 100 GPa to about 140 GPa, about 100 GPa to about 135 GPa, about 100 GPa to about 130 GPa, about 100 GPa to about 125 GPa, about 100 GPa to about 120 GPa, about 100 GPa to about 115 GPa, about 100 GPa to about 110 GPa, about 105 GPa to about 140 GPa, about 105 GPa to about 135 GPa, about 105 GPa to about 130 GPa, about 105 GPa to about 125 GPa, about 105 GPa to about 120 GPa, about 105 GPa to about 115 GPa, about 105 GPa to about 110 GPa, about 110 GPa to about 140 GPa, about 110 GPa to about 135 GPa, about 110 GPa to about 130 GPa, about 110 GPa to about 125 GPa, about 110 GPa to about 120 GPa, about 110 GPa to about 115 GPa, or any ranges and subranges therebetween. The Young's modulus value recited in this disclosure refers to a value (converted into GPa) as measured by a resonant ultrasonic spectroscopy technique of the general type set forth in ASTM E2001-13, titled "Standard Guide for Resonant Ultrasound Spectroscopy for Defect Detection in Both Metallic and Nonmetallic Parts."

In various embodiments, this disclosure also provides a glass based article characterized by a low stress optical coefficient (SOC). As understood by those skilled in the art, SOC is related to the birefringence of the glass. In any of the embodiments described herein, the glass based article can have a SOC of not more than 3 Brewster (e.g., not more than 2 Brewster, not more than 1.5 Brewster, or not more than 1 Brewster). In some embodiments, the glass based article has a SOC of about 1.3 Brewster, about 1.5 Brewster, about 1.7 Brewster, about 1.9 Brewster, about 2 Brewster, or any ranges between the specified values. In some embodiments, the glass based article has a SOC of about 1.3 Brewster to about 2 Brewster. SOC values can be measured as set forth in Procedure C (Glass Disc Method) of ASTM standard C770-16, entitled "Standard Test Method for Measurement of Glass Stress-Optical Coefficient."

The glass based articles described herein can be characterized by more than one properties of fracture toughness, Young's modulus, and stress optical coefficient. For example, in some embodiments, the glass based article described herein can be characterized by (i) a fracture toughness of at least 0.8 MPa*m$^{0.5}$; (ii) a Young's modulus value of at least 90 GPa; and/or (iii) a stress optical coefficient (SOC) of not more than 3 Brewster In any of the embodiments described herein, the glass based article is substantially transparent.

Devices

The glass based articles described herein can have various applications, for example, where a high fracture toughness is desired. Those skilled in the art would understand that the glass based articles described herein can take various shapes, thickness, etc. according to its specific applications.

Figure 1B:
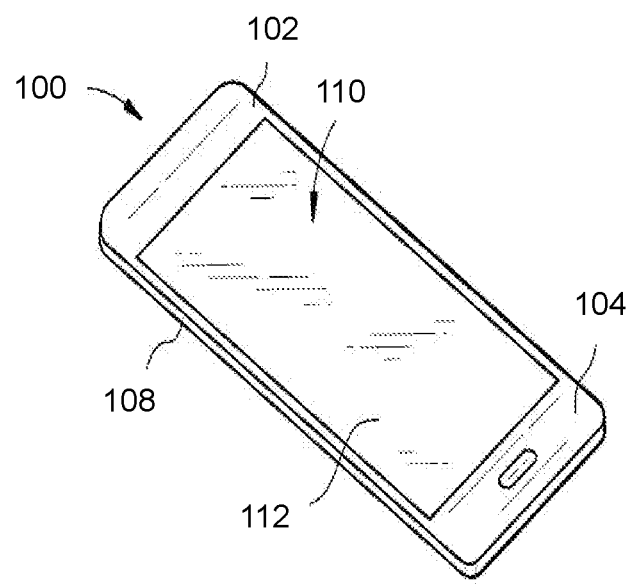
FIG. 1B is a perspective view of the exemplary electronic device of FIG. 1A.

For example, the glass based articles disclosed herein may be incorporated into another article such as an article with a display (or display articles) (e.g., consumer electronics, including mobile phones, tablets, computers, laptops, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass based articles disclosed herein is shown in FIGS. 1A and 1B. Specifically, FIGS. 1A and 1B show a consumer electronic device 100 including a housing 102 having front 104, back 106, and side 108 surfaces; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In some embodiments, at least one of a portion of the housing 102 or the cover substrate 112 may include any of the glass based articles disclosed herein.

EXAMPLES

The following examples further illustrate the advantages and features of this disclosure and are in no way intended to limit this disclosure thereto.

Inasmuch as the sum of the individual constituents totals or very closely approximates 100, for all practical purposes the reported values may be deemed to represent mole %. The actual batch ingredients may comprise any materials, either oxides, or other compounds, which, when melted together with the other batch components, will be converted into the desired oxide in the proper proportions.

Glasses having the compositions listed in Table I were prepared and the various properties listed in Table I were measured. The compositions were reported in mol % on an oxide bases.

TABLE I

Example glasses made in experiment.

| Sample No. | 1 | 2 | 3 | 4 | 5 | 6 |
|---|---|---|---|---|---|---|
| SiO$_2$ | 44.854 | 58.496 | 44.009 | 54.689 | 44.593 | 43.992 |
| Al$_2$O$_3$ | 0 | 20.532 | 7.926 | 25.425 | 10.018 | 12.014 |
| B$_2$O$_3$ | 7.975 | 0 | 0 | 0 | 0 | 0 |
| P$_2$O$_5$ | 0 | 5.372 | 0 | 0 | 0 | 0 |
| MgO | 31.327 | 5.11 | 30.76 | 5.894 | 28.852 | 27.393 |
| La$_2$O$_3$ | 7.886 | 5.25 | 9.007 | 7.318 | 8.465 | 8.484 |
| Li$_2$O | 7.957 | 5.24 | 8.298 | 6.673 | 8.072 | 8.118 |
| Na$_2$O | 0 | 0 | 0 | 0 | 0 | 0 |
| | | | | | | |
| Total | 99.999 | 100 | 100 | 99.999 | 100 | 100.001 |
| Density (g/cm$^3$) | 2.859 | 3.068 | 3.498 | 3.464 | 3.472 | 3.441 |
| Poisson's Ratio | 0.269 | 0.246 | 0.276 | 0.264 | 0.272 | 0.272 |
| Shear Modulus (GPa) | 44.7 | 36.4 | 46.1 | 40.5 | 48.5 | 45.6 |
| Young's Modulus (GPa) | 113.56 | 90.74 | 117.76 | 102.46 | 117.1 | 116.0 |
| Annealing Point (° C.) | 597.9 | 732.2 | 650.3 | 734.5 | 652.3 | 653.7 |
| Strain Point (° C.) | 564 | 688.3 | 614.9 | 693.3 | 617.1 | 617.3 |
| Softening Point (° C.) | 723.1 | 908.8 | 789.1 | 924.5 | 794.6 | 794.9 |
| Fracture toughness ($K_{1C}$[MPA * m$^{0.5}$]) | 0.81 | 0.85 | 0.87 | 0.95 | 0.844 | 0.863 |
| $K_{1C}$ Standard deviation | 0.012 | 0.005 | 0.018 | 0.026 | 0.01 | 0.019 |
| SOC (Brewsters) | 1.726 | 2.616 | 1.661 | 2.317 | 1.675 | 1.722 |
| CTE (ppm/K) | 8.75 | 4.44 | 8.24 | 4.93 | 6.88 | 6.61 |

| Sample No. | 7 | 8 | 9 | 10 | 11 | 12 |
|---|---|---|---|---|---|---|
| SiO$_2$ | 44.303 | 44.39 | 44.288 | 44.062 | 44.505 | 44.045 |
| Al$_2$O$_3$ | 14.003 | 8.008 | 7.966 | 8.893 | 9.968 | 11.001 |
| B$_2$O$_3$ | 0 | 0 | 0 | 0 | 0 | 0 |
| P$_2$O$_5$ | 0 | 0 | 0 | 0 | 0 | 0 |
| MgO | 25.218 | 28.94 | 27.062 | 29.328 | 27.49 | 25.873 |
| La$_2$O$_3$ | 8.566 | 8.592 | 8.595 | 9.616 | 10.176 | 11.135 |
| Li$_2$O | 7.91 | 10.071 | 12.089 | 8.101 | 7.862 | 7.947 |
| Na$_2$O | 0 | 0 | 0 | 0 | 0 | 0 |
| | | | | | | |
| Total | 100 | 100.001 | 100 | 100 | 100.001 | 100.001 |
| Density (g/cm$^3$) | 3.412 | 3.48 | 3.459 | 3.566 | 3.628 | 3.686 |
| Poisson's Ratio | 0.275 | 0.268 | 0.277 | 0.275 | 0.281 | 0.286 |
| Shear Modulus (GPa) | 45.0 | 46.5 | 46.4 | 46.2 | 46.0 | 45.8 |
| Young's Modulus (GPa) | 114.9 | 117.8 | 118.5 | 117.8 | 117.8 | 117.8 |
| Annealing Point (° C.) | 657.1 | 634.8 | 655.8 | 656.1 | 662.1 | 667.3 |
| Strain Point (° C.) | 620.8 | 600.2 | 620.4 | 620.6 | 626.9 | 631.6 |
| Softening Point (° C.) | 804.2 | | | | | |
| Fracture toughness ($K_{1C}$[MPA * m$^{0.5}$]) | 0.864 | 0.837 | 0.826 | 0.851 | 0.88 | 0.834 |
| $K_{1C}$ Standard deviation | 0.008 | 0.028 | 0.002 | 0.001 | 0.022 | 0.034 |
| SOC (Brewsters) | 1.77 | 1.627 | 1.601 | 1.598 | 1.575 | 1.515 |
| CTE (ppm/K) | 6.29 | 7.19 | 7.45 | 7.15 | 7.01 | 6.93 |

| Sample No. | 13 | 14 | 15 | 16 | 17 | 18 |
|---|---|---|---|---|---|---|
| SiO$_2$ | 44.123 | 43.673 | 44.166 | 44.31 | 44.882 | 44.424 |
| Al$_2$O$_3$ | 8.997 | 10.202 | 10.999 | 8.996 | 15.981 | 18.023 |
| B$_2$O$_3$ | 0 | 0 | 0 | 0 | 0 | 0 |
| P$_2$O$_5$ | 0 | 0 | 0 | 0 | 0 | 0 |
| MgO | 29.127 | 27.763 | 25.278 | 28.195 | 23.044 | 21.457 |
| La$_2$O$_3$ | 8.542 | 8.368 | 8.508 | 9.616 | 8.077 | 8.192 |
| Li$_2$O | 9.21 | 9.995 | 11.048 | 8.883 | 8.016 | 7.903 |
| Na$_2$O | 0 | 0 | 0 | 0 | 0 | 0 |
| | | | | | | |
| Total | 99.999 | 100.001 | 99.999 | 100 | 100 | 99.999 |
| Density (g/cm$^3$) | 3.474 | 3.446 | 3.423 | 3.555 | 3.382 | 3.352 |
| Poisson's Ratio | 0.269 | 0.28 | 0.274 | 0.277 | 0.275 | 0.271 |
| Shear Modulus (GPa) | 46.1 | 45.4 | 45.2 | 46.1 | 44.5 | 44.3 |
| Young's Modulus (GPa) | 116.9 | 116.2 | 115.3 | 117.7 | 113.6 | 112.5 |
| Annealing Point (° C.) | 641.9 | 635.3 | 629.5 | 649 | 659.8 | 663.7 |

TABLE I-continued

Example glasses made in experiment.

| | | | | | | |
|---|---|---|---|---|---|---|
| Strain Point (° C.) | 606.3 | 600.8 | 594.6 | 614.3 | 622.3 | 626.3 |
| Softening Point (° C.) | 777.5 | | | | 807.9 | 815.2 |
| Fracture toughness ($K_{1C}$[MPA * $m^{0.5}$]) | 0.855 | | 0.836 | 0.839 | 0.898 | 0.874 |
| $K_{1C}$ Standard deviation | 0.012 | | 0.014 | 0.007 | 0.03 | 0.003 |
| SOC (Brewsters) | 1.661 | 1.665 | 1.687 | 1.606 | 1.821 | 1.864 |
| CTE (ppm/K) | 7.04 | 7.1 | 6.99 | 7.18 | 6.24 | 5.78 |

| Sample No. | 19 | 20 | 21 | 22 | 23 | 24 |
|---|---|---|---|---|---|---|
| $SiO_2$ | 44.378 | 44.176 | 44.535 | 44.487 | 44.524 | 44.318 |
| $Al_2O_3$ | 19.878 | 21.847 | 24.121 | 26.043 | 28.074 | 30.202 |
| $B_2O_3$ | 0 | 0 | 0 | 0 | 0 | 0 |
| $P_2O_5$ | 0 | 0 | 0 | 0 | 0 | 0 |
| MgO | 19.785 | 17.999 | 15.384 | 13.46 | 11.328 | 9.663 |
| $La_2O_3$ | 7.98 | 8.094 | 8.107 | 8.123 | 8.047 | 8.117 |
| $Li_2O$ | 7.978 | 7.883 | 7.854 | 7.886 | 8.028 | 7.699 |
| $Na_2O$ | 0 | 0 | 0 | 0 | 0 | 0 |
| Total | 99.999 | 99.999 | 100.001 | 99.999 | 100.001 | 99.999 |
| Density (g/cm^3) | 3.327 | 3.309 | 3.288 | 3.261 | 3.25 | 3.233 |
| Poisson's Ratio | 0.277 | 0.272 | 0.271 | 0.274 | 0.273 | 0.27 |
| Shear Modulus (GPa) | 43.9 | 43.7 | 43.5 | 43.3 | 43.2 | 43.1 |
| Young's Modulus (GPa) | 112.2 | 111.1 | 110.5 | 110.2 | 109.8 | 109.4 |
| Annealing Point (° C.) | 669.2 | 677 | 683.3 | 691 | 703.2 | 709.2 |
| Strain Point (° C.) | 631.3 | 639 | 645 | 652.2 | 664.9 | 670.5 |
| Softening Point (° C.) | 823.9 | 832 | 840.5 | 851.3 | 862.7 | 867.7 |
| Fracture toughness ($K_{1C}$[MPA * $m^{0.5}$]) | 0.961 | 0.893 | 0.954 | 0.933 | 0.909 | 0.929 |
| $K_{1C}$ Standard deviation | 0.048 | 0.041 | 0.003 | 0.021 | 0.008 | 0.02 |
| SOC (Brewsters) | 1.895 | 1.93 | 1.947 | 2.01 | | 2.067 |
| CTE (ppm/K) | 5.52 | 5.31 | 4.94 | 4.86 | 4.78 | 4.42 |

| Sample No. | 25 | 26 | 27 | 28 | 29 | 30 |
|---|---|---|---|---|---|---|
| $SiO_2$ | 44.149 | 44.162 | 44.179 | 44.468 | 44.185 | 44.269 |
| $Al_2O_3$ | 32.318 | 33.941 | 35.934 | 37.582 | 10.909 | 13.002 |
| $B_2O_3$ | 0 | 0 | 0 | 0 | 0 | 0 |
| $P_2O_5$ | 0 | 0 | 0 | 0 | 0 | 0 |
| MgO | 7.606 | 5.916 | 3.85 | 1.911 | 26.791 | 23.046 |
| $La_2O_3$ | 8.001 | 8.002 | 8.061 | 8.084 | 9.095 | 9.848 |
| $Li_2O$ | 7.925 | 7.98 | 7.976 | 7.955 | 9.02 | 9.834 |
| $Na_2O$ | 0 | 0 | 0 | 0 | 0 | 0 |
| Total | 99.999 | 100.001 | 100 | 100 | 100 | 99.999 |
| Density (g/cm^3) | 3.219 | 3.21 | 3.203 | 3.197 | 3.527 | 3.557 |
| Poisson's Ratio | 0.268 | 0.274 | 0.273 | 0.264 | 0.277 | 0.274 |
| Shear Modulus (GPa) | 43.2 | 42.9 | 43.0 | 43.0 | 45.6 | 45.2 |
| Young's Modulus (GPa) | 109.5 | 109.2 | 109.6 | 108.8 | 116.5 | 115.1 |
| Annealing Point (° C.) | 722 | 732.5 | 743.9 | 757.7 | 650.6 | 647.7 |
| Strain Point (° C.) | 683 | 693.5 | 705.3 | 719.1 | 615.6 | 612.4 |
| Softening Point (° C.) | 881.6 | 888.3 | 898.5 | 906.9 | | |
| Fracture toughness ($K_{1C}$[MPA * $m^{0.5}$]) | 0.913 | 0.947 | 0.932 | 0.965 | 0.846 | |
| $K_{1C}$ Standard deviation | 0.013 | 0.004 | 0.011 | 0.011 | 0.025 | |
| SOC (Brewsters) | 2.094 | 2.114 | 2.136 | 2.156 | 1.649 | 1.616 |
| CTE (ppm/K) | 4.55 | 4.32 | 4.2 | 4.1 | 6.9 | 6.47 |

| Sample No. | 31 | 32 | 33 | 34 | 35 |
|---|---|---|---|---|---|
| $SiO_2$ | 54.908 | 37.077 | 44.702 | 44.245 | 44.526 |
| $Al_2O_3$ | 18.309 | 14.177 | 18.87 | 20.819 | 22.637 |
| $B_2O_3$ | 0 | 0 | 0 | 0 | 0 |
| $P_2O_5$ | 0 | 0 | 0 | 0 | 0 |
| MgO | 0.037 | 28.481 | 10.396 | 6.872 | 2.889 |
| $La_2O_3$ | 13.491 | 10.335 | 13.22 | 14.364 | 15.166 |
| $Li_2O$ | 13.255 | 9.931 | 12.813 | 13.7 | 14.781 |
| $Na_2O$ | 0 | 0 | 0 | 0 | 0 |
| Total | 100 | 100.001 | 100.001 | 100 | 99.999 |
| Density (g/cm^3) | 3.568 | 3.61 | 3.638 | 3.665 | 3.691 |
| Poisson's Ratio | 0.27 | 0.278 | 0.274 | 0.278 | 0.281 |
| Shear Modulus (GPa) | 40.1 | 46.8 | 43.6 | 43.2 | 42.8 |
| Young's Modulus (GPa) | 101.8 | 119.6 | 111.1 | 110.3 | 109.7 |

TABLE I-continued

Example glasses made in experiment.

| | | | | |
|---|---|---|---|---|
| Annealing Point (° C.) | 682.5 | | 656.6 | 660.3 | 668.8 |
| Strain Point (° C.) | 645.3 | | 620.9 | 625.1 | 632.7 |
| Softening Point (° C.) | | | | | |
| Fracture toughness ($K_{1C}$[MPA * $m^{0.5}$]) | 0.805 | | | 0.837 | 0.938 |
| $K_{1C}$ Standard deviation | 0.092 | | | 0.034 | |
| SOC (Brewsters) | 1.798 | 0 | 1.623 | 0 | |
| CTE (ppm/K) | 6.45 | 7.23 | 6.51 | 6.47 | 6.56 |

For samples 1-35 listed in Table I, raw materials containing each of the individual oxides are mixed and melted to obtain the respective compositions. Compositions and physical properties were obtained via standard physical/chemical methods, and as described below.

The glass properties set forth in Table I were determined in accordance with techniques conventional in the glass art. Thus, the linear coefficient of thermal expansion (CTE) over the temperature range 0-300° C. is expressed in terms of ppm/K and was determined from fiber elongation technique, ASTM reference E228-11. The density was determined using the buoyancy method of ASTM C693-93(2013). Young's modulus values in terms of GPa, shear modulus values in terms of GPa, and Poisson's ratio were determined using a resonant ultrasonic spectroscopy technique of the general type set forth in ASTM E2001-13. The annealing point and strain point were determined using the beam bending viscosity method of ASTM C598-93(2013). The softening point was determined using the parallel plate viscosity method of ASTM C338-93(2013). Stress optical coefficient (SOC) values can be measured by Procedure C (Glass Disc Method) of ASTM standard C770-16 Fracture Toughness ($K_{1C}$ [MPa*$m^{0.5}$]) was determined using the method described above.

In an aspect (1), a glass based article comprises:
$SiO_2$ in a range from about 20 mol % to about 80 mol %;
$Al_2O_3$ in a range from about 2 mol % to about 60 mol %;
MgO;
$Li_2O$;
$La_2O_3$ in an amount greater than or equal to about 3 mol %;
a sum of alkali metal oxides ($R_2O$) is greater than or equal to about 6 mol %; and
a sum of MgO and $Al_2O_3$ is greater than or equal to about 28 mol %,
wherein the glass based article is free of $B_2O_3$.

An aspect (2) according to aspect (1), wherein (i) a fracture toughness is at least 0.8 MPa*$m^{0.5}$; (ii) a Young's modulus value is at least 90 GPa; and/or (iii) a stress optical coefficient (SOC) is not more than 3 Brewster.

An aspect (3) according to any preceding aspect, wherein $La_2O_3$ is in a range from about 3 mol % to about 18 mol %.

An aspect (4) according to any preceding aspect, wherein $La_2O_3$ is in a range from about 5 mol % to about 15 mol %.

An aspect (5) according to any preceding aspect, wherein MgO is in a range from about 1 mol % to about 42 mol %.

An aspect (6) according to any preceding aspect, wherein MgO is in a range from about 2 mol % to about 37 mol %.

An aspect (7) according to any preceding aspect, wherein MgO is in a range from about 3 mol % to about 32 mol %.

An aspect (8) according to any preceding aspect, wherein the sum of $R_2O$ is in a range from about 6 mol % to about 15 mol %.

An aspect (9) according to any preceding aspect, comprising:
MgO in the range of about 1 mol % to about 42 mol %;
$La_2O_3$ in the range of about 3 mol % to about 18 mol %; and
the sum of $R_2O$ is in a range from about 6 mol % to about 15 mol %.

An aspect (10) according to any preceding aspect, comprising:
$SiO_2$ in the range of about 25 mol % to about 70 mol %; and $Al_2O_3$ in the range of about 4 mol % to about 50 mol %.

An aspect (11) according to aspect (10), comprising:
$SiO_2$ in the range of about 30 mol % to about 60 mol %; and $Al_2O_3$ in the range of about 8 mol % to about 40 mol %.

An aspect (12) according to any preceding aspect, comprising:
$SiO_2$ in the range of about 25 mol % to about 70 mol %;
$Al_2O_3$ in the range of about 4 mol % to about 50 mol %;
MgO in the range of about 2 mol % to about 37 mol %;
$La_2O_3$ in the range of about 3 mol % to about 18 mol %; and
the sum of $R_2O$ is in a range in a range from about 6 mol % to about 15 mol %.

An aspect (13) according to any preceding aspect, comprising:
$SiO_2$ in the range of about 30 mol % to about 60 mol %;
$Al_2O_3$ in the range of about 8 mol % to about 40 mol %;
MgO in the range of about 3 mol % to about 32 mol %;
$La_2O_3$ in the range of about 5 mol % to about 15 mol %; and
the sum of $R_2O$ is in a range in a range from about 6 mol % to about 15 mol %.

In an aspect (14), a consumer electronic device comprises:
a housing comprising a front surface, a back surface and side surfaces;
electrical components at least partially within the housing, the electrical components comprising at least a controller, a memory, and a display, the display at or adjacent the front surface of the housing; and
a cover substrate disposed over the display,
wherein at least one of a portion of the housing or the cover substrate comprises the glass based article of any preceding aspect.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

All of the various aspects, embodiments, and options described herein can be combined in any and all variations.

All publications, patents, and patent applications mentioned in this specification are herein incorporated by reference to the same extent as if each individual publication, patent, or patent application was specifically and individually indicated to be incorporated by reference.

What is claimed:

1. A glass based article comprising:
   $SiO_2$ in a range from 20 mol % to 63 mol %;
   $Al_2O_3$ in a range from 15 mol % to 60 mol %;
   MgO;
   $Li_2O$;
   $La_2O_3$ in an amount greater than or equal to 3 mol %;
   a sum of alkali metal oxides ($R_2O$) is greater than or equal to 6 mol %; and
   a sum of MgO and $Al_2O_3$ is greater than or equal to 28 mol %,
   wherein the glass based article is free of $B_2O_3$.

2. The glass based article of claim 1, wherein MgO is in a range from 1 mol % to 42 mol %.

3. The glass based article of claim 1, wherein the sum of $R_2O$ is in a range from 6 mol % to 15 mol %.

4. The glass based article of claim 1, wherein $La_2O_3$ is in a range from 5 mol % to 15 mol %.

5. The glass based article of claim 4, wherein MgO is in a range from 3 mol % to 32 mol %.

6. The glass based article of claim 1, wherein $La_2O_3$ is in a range from 3 mol % to 18 mol %.

7. The glass based article of claim 6, wherein MgO is in a range from 2 mol % to 37 mol %.

8. The glass based article of claim 1, comprising:
   MgO in the range of 1 mol % to 12 mol %;
   $La_2O_3$ in the range of 3 mol % to 18 mol %; and
   the sum of $R_2O$ is in a range from 6 mol % to 15 mol %.

9. The glass based article of claim 8, comprising:
   $SiO_2$ in the range of 25 mol % to 63 mol %; and
   $Al_2O_3$ in the range of 15 mol % to 50 mol %.

10. The glass based article of claim 9, comprising:
    $SiO_2$ in the range of 30 mol % to 63 mol %; and
    $Al_2O_3$ in the range of 15 mol % to 40 mol %.

11. The glass based article of claim 1, comprising:
    $SiO_2$ in the range of 25 mol % to 63 mol %;
    $Al_2O_3$ in the range of 15 mol % to 50 mol %;
    MgO in the range of 2 mol % to 37 mol %;
    $La_2O_3$ in the range of 3 mol % to 18 mol %; and
    the sum of $R_2O$ is in a range from 6 mol % to 15 mol %.

12. The glass base article of claim 1, comprising:
    $SiO_2$ in the range of 30 mol % to 63 mol %;
    $Al_2O_3$ in the range of 15 mol % to 40 mol %;
    MgO in the range of 3 mol % to 32 mol %;
    $La_2O_3$ in the range of 5 mol % to 15 mol %; and
    the sum of $R_2O$ is in a range from 6 mol % to 15 mol %.

13. The glass based article of claim 1, wherein (i) a fracture toughness is at least $0.8$ $MPa*m^{0.5}$, (ii) a Young's modulus value is at least 90 GPa; and/or (iii) a stress optical coefficient (SOC) is not more than 3 Brewster.

14. A consumer electronic product, comprising:
    a housing comprising a front surface, a back surface and side surfaces;
    electrical components at least partially within the housing, the electrical components comprising at least a controller, a memory, and a display, the display at or adjacent the front surface of the housing; and
    a cover substrate disposed over the display,
    wherein at least one of a portion of the housing or the cover substrate comprises the glass based article of claim 1.

* * * * *